US005269538A

United States Patent [19]

Strang

[11] Patent Number: 5,269,538

[45] Date of Patent: Dec. 14, 1993

[54] LOCK SEAL

[75] Inventor: Jorgen Strang, Gothenburg, Sweden

[73] Assignee: AB Volvo, Sweden

[21] Appl. No.: 849,011

[22] PCT Filed: Oct. 19, 1990

[86] PCT No.: PCT/SE90/00674

§ 371 Date: Jun. 5, 1992

§ 102(e) Date: Jun. 5, 1992

[87] PCT Pub. No.: WO91/06732

PCT Pub. Date: May 16, 1991

[30] Foreign Application Priority Data

Oct. 25, 1989 [SE] Sweden ................................ 8903543

[51] Int. Cl.⁵ .......................... F16J 15/00; E06B 7/20

[52] U.S. Cl. .................................... 277/184; 277/227; 49/311; 49/479.1; 292/341.12

[58] Field of Search ................. 277/34, 184, 226, 228; 49/477, 479, 310, 311, 313, 314, 484; 292/341.11, 341.12, 341.14, DIG. 56, DIG. 70, DIG. 71, DIG. 73

[56] References Cited

U.S. PATENT DOCUMENTS

| | | | |
|---|---|---|---|
| 2,696,029 | 12/1954 | Neff | 49/484 |
| 3,164,870 | 1/1965 | Harms et al. | 49/495 |
| 3,359,687 | 12/1967 | Wallace | 49/477 |
| 3,449,864 | 6/1969 | Prest-Dame et al. | 277/226 |
| 3,538,643 | 11/1970 | Omlie | 49/311 |
| 4,614,347 | 9/1986 | Kruschwitz | 277/184 |
| 4,667,966 | 5/1987 | Oehrle et al. | 277/226 |
| 4,977,706 | 12/1990 | Kisanuki | 49/479 |
| 5,154,952 | 10/1992 | Nozaki | 292/DIG. 70 |

FOREIGN PATENT DOCUMENTS

| | | |
|---|---|---|
| 0040596 | 11/1981 | European Pat. Off. . |
| 0156736 | 10/1985 | European Pat. Off. . |
| 2608773 | 12/1979 | Fed. Rep. of Germany . |
| 3141729 | 4/1983 | Fed. Rep. of Germany . |
| 3511143 | 10/1985 | Fed. Rep. of Germany . |
| 3713558 | 8/1989 | Fed. Rep. of Germany . |

*Primary Examiner*—William A. Cuchlinski, Jr.
*Assistant Examiner*—Daniel G. DePumpo
*Attorney, Agent, or Firm*—Lerner, David, Littenberg, Krumholz & Mentlik

[57] ABSTRACT

Seal preferably intended to be used for door locks on motor vehicles. The seal comprises an annular base part, an annular combined sealing surface made up of a first part surface and a second part surface which intersect at an intersection region at an angle $\beta$, and an annular flexible element connecting the base part with the combined sealing surface. The seal is arranged such that, for example, when a vehicle door to which the lock is fitted is in a non-sealing position, the first part surface of the combined sealing surface forms an angle $\alpha$ in relation to a plane A—A which is parallel to the part of the door which is to be sealed. When the door is closed, the second part surface of the combined sealing surface is acted upon by a region of the door to thereby cause the first part surface of the combined sealing surface to adopt a position substantially parallel to the plane A—A such that an annular area of the surfaces on the part of the door is sealingly enclosed by said combined sealing surface.

8 Claims, 5 Drawing Sheets

LOCK SEAL

TECHNICAL FIELD

The present invention relates to a seal preferably intended to be used for door locks on motor vehicles, i.e. a seal for sealing in a predetermined position of, and between, surfaces on two parts which are moveable in relation to each other, with the seal being mounted on one of said parts.

BACKGROUND OF THE INVENTION

With the modern type of "flush locks", penetration of water and dirt occurs more easily than with the old two-component type of locks (an inner lock and an outer lock). Today's locks also contain more electronics than the earlier ones which increases the need for effective sealing. Automatic car washes using high pressure are becoming more and more frequent which also increases the risk of water penetration, which results in functional disturbances.

The problem is well-known and several solutions exist. DE-A-35 11 143, for example, shows a solution where a surrounding is used seal to provide protection against penetration of water. This requires, however, a special shape of the surrounding seal and a complicated application method which undesirable.

Another German patent specification, DE-C-37 13 558, shows that the above mentioned disadvantages have been identified to a certain extent and it is proposed here to have a seal which partly solves some of these problems. Thus, a seal is shown in this specification which is integrated with the lock-hook of the lock and where the seal directly seals against the door plate around the seal. The general problem here is to obtain a good seal against a surface forming rear edge of the door, the plane of which is substantially parallel to the movement direction at the moment of closing. The sealing of a space where two surfaces are displaced parallelly is generally difficult. In the known specification two solutions have been proposed. The first consists of arranging blade-shaped protruding seals at the lock hook, which are intended to co-operate with the rear door edge surfaces. Here it is intended that the flexibility and elasticity of these will provide a sealing abutment around the lock after closing of the door. It is, however, evident that this solution gives rise to wear on the protruding blade-shaped members. Thus, the life of such a sealing arrangement is very limited. In addition, the risk exists that the seal becomes folded at the moment of closing and will not come into its intended sealing position.

The second solution variant solves the general first mentioned problem in another way. By arranging an extra element provided with flanges on the door, the problem to seal against two parallelly running surfaces is avoided. Said flanges protrude transversely in relation to said plane of the surface and co-operate with corresponding sealing surfaces which have been arranged at the lock hook. As is said in the description this requires, however, a very exact adjustment or also an extreme over-dimensioning whereby i.a. severe wearing must be taken into account. The adjusting requirement is not desirable, and neither is a quick wearing of the sealing element.

SUMMARY OF THE INVENTION

It is therefore an object of the present invention is to provide a seal which eliminates the disadvantages identified above when sealing of areas of the above-mentioned nature. Said object is attained by means of a seal according to the present invention which is annular in shape and sealing surfaces of which can be displaced between a non-sealing position and a sealing position responsive to relative movement of the two parts which carry the surfaces to be sealed.

BRIEF DESCRIPTION OF THE DRAWINGS

The invention shall be described further in the following by means of an embodiment example with reference to the attached drawings in which.

DETAILED DESCRIPTION

Figure 1:
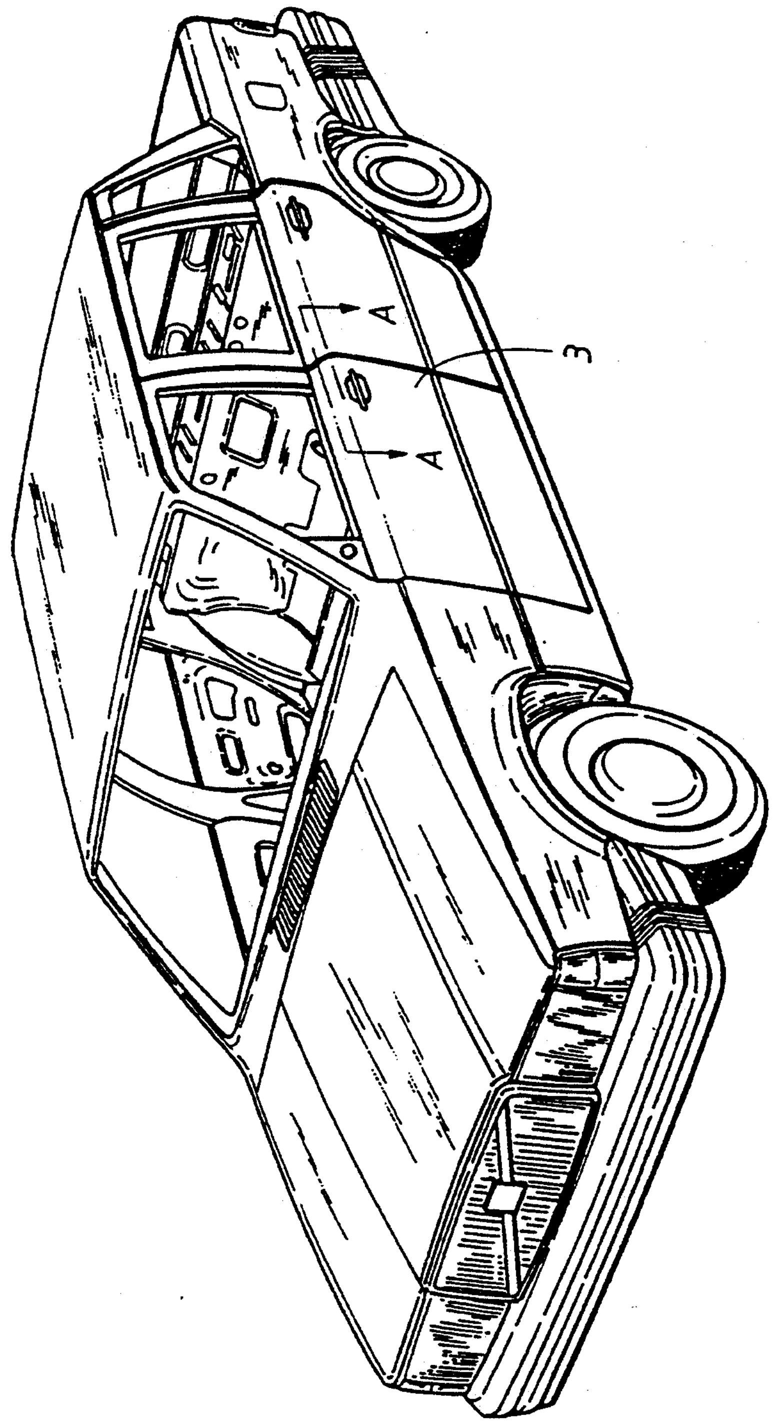
FIG. 1 is a perspective view of a motor vehicle on which a preferred embodiment of a seal according to the invention is arranged.
Figure 2:
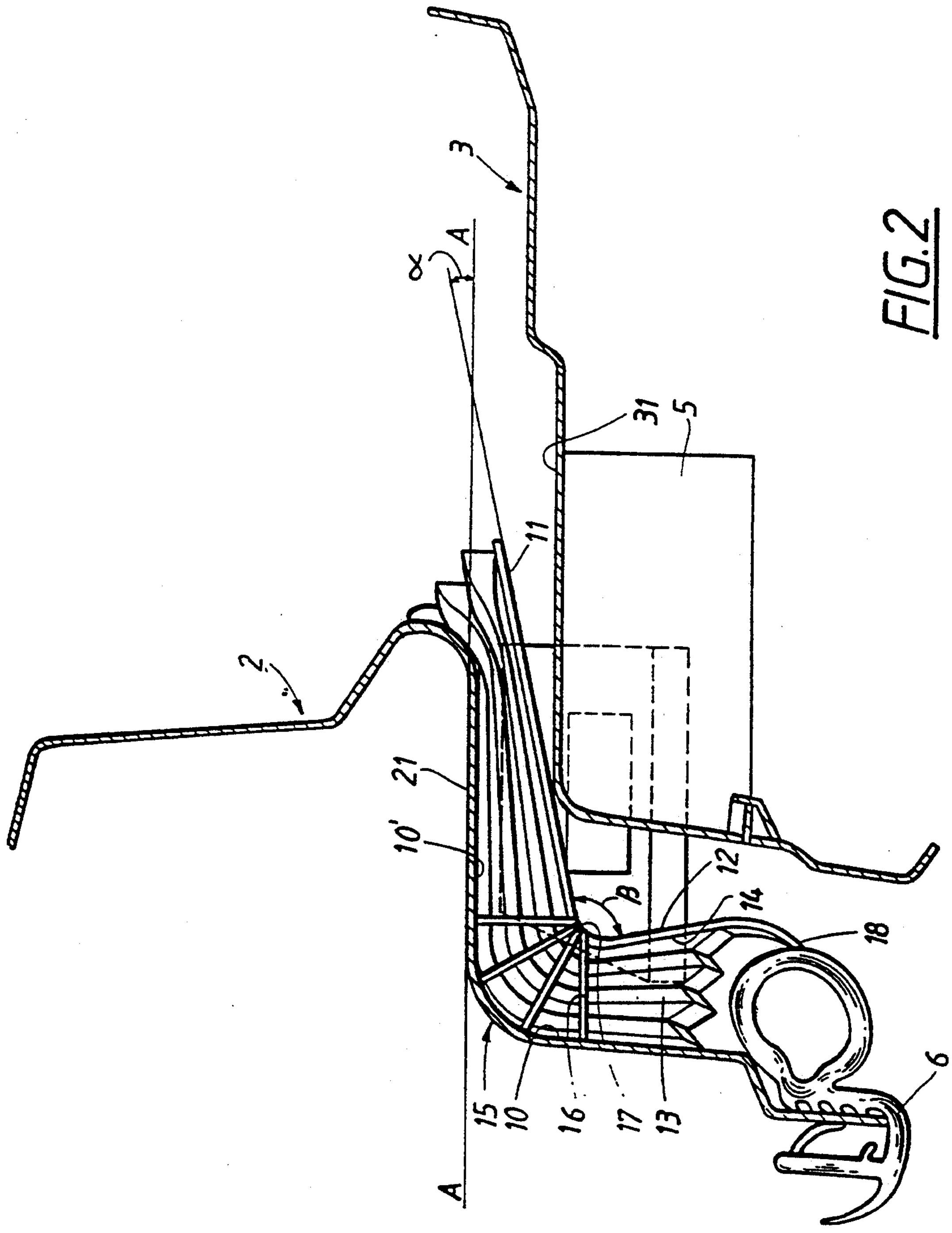
FIG. 2 shows a horizontal sectional view through a vehicle having an open door at the marked section A—A in FIG. 1.

FIG. 1 shows a motor vehicle which is provided with a number of doors. On each of the doors 3 there is a lock arrangement 5, preferably containing electronic components. These electronic components are here protected by the seal 1 according to the invention which is provided on the door pillar 2 of the vehicle. FIG. 2 shows a preferred embodiment of the seal 1 according to the invention arranged on a pillar 2 of a vehicle. The door 3 is here shown in a partly opened position. A locking arrangement 5 which needs to be protected against humidity is arranged on the door 3. The lock arrangement 5 co-operates with a lock hook 4 which is arranged on said pillar 2. The seal 1 is also arranged on the pillar 2 by means of this lock hook 4. The seal 1 consists of an annular base part 10 which sealingly abuts against the pillar 2. This base part 10 runs substantially along two portions of planes which are substantially perpendicular to each other. Further, the seal 1 consists of an annular combined sealing surface made up of a first part surface 11 and a second part surface 12, which combined sealing surface 11, 12 is movable to some extent. A bellow-shaped flexible element 13 connects said combined sealing surface 11, 12 with said base part 10. To obtain a reliable sealing against the pillar 2 the preferred embodiment shows that the base part 10 has at its front edge a bent final part 19 which shall guarantee sealing abutment in this area. At the other end of the seal there is co-operating therewith a first seal 6. This first seal 6 is of a conventional type and co-operates with the lock seal by means of a protruding lip 18 on the seal 1.

The seal 1 has in connection with said combined sealing surface 11, 12 a supporting element 14 which carries the combined sealing surface 11, 12. This supporting element 14 is relatively rigid and intended to substantially maintain its predetermined shape also under external influence. Co-operating with said supporting element 14 is a hinging arrangement 15 about which the supporting element 14 and thereby also the combined sealing surface 11, 12 can pivot. A region of said combined sealing surface 11, 12 corresponding to said second part surface 12 forms a protruding part by the influence of which the seal can be made to pivot about said hinging arrangement 15.

The hinging arrangement 15 consists in this preferred embodiment of reinforcements 16 which extend transversely between extended parts along the base part 10 and a substantially common point 17 in the vicinity of said supporting element 14. This common point 17 forms a pivot point for the combined sealing surface of the seal 1. The reinforcements 16 consist of transversely extending thickenings preferably made of the same material which is used either in the supporting element 14 or the bellow 13. The reinforcements 16 are here integrated with the supporting element 14.

The active part of the combined sealing surface 11, 12 is arranged in two planes which are substantially perpendicular in relation to each other and these planes are separated by an angle $\beta$ which is approximately 90°. It can be seen from FIG. 2 that the seal in this preferred embodiment has been arranged with certain tolerance and that accordingly the reinforcement 16 in the closed door position may be somewhat compressed.

A first surface part 10' of the base part 10 is arranged on a part surface 21 of the pillar 2, in a first plane A—A (which is not to be confused with section A—A). This plane, A—A, is substantially parallel to the rear surface 31 of the door 3 that is to be sealed in the closed position of the door.

The inherent elasticity of the seal 1 influences the seal to take up the position shown in FIG. 2 when the seal 1 is not influenced by other external forces. Thus, the first part surface 11 of the combined sealing surface 11, 12 which is adjacent said part surface 21 of the pillar 2 forms an angle $\alpha$ with the earlier mentioned plane A—A.

Figure 3:
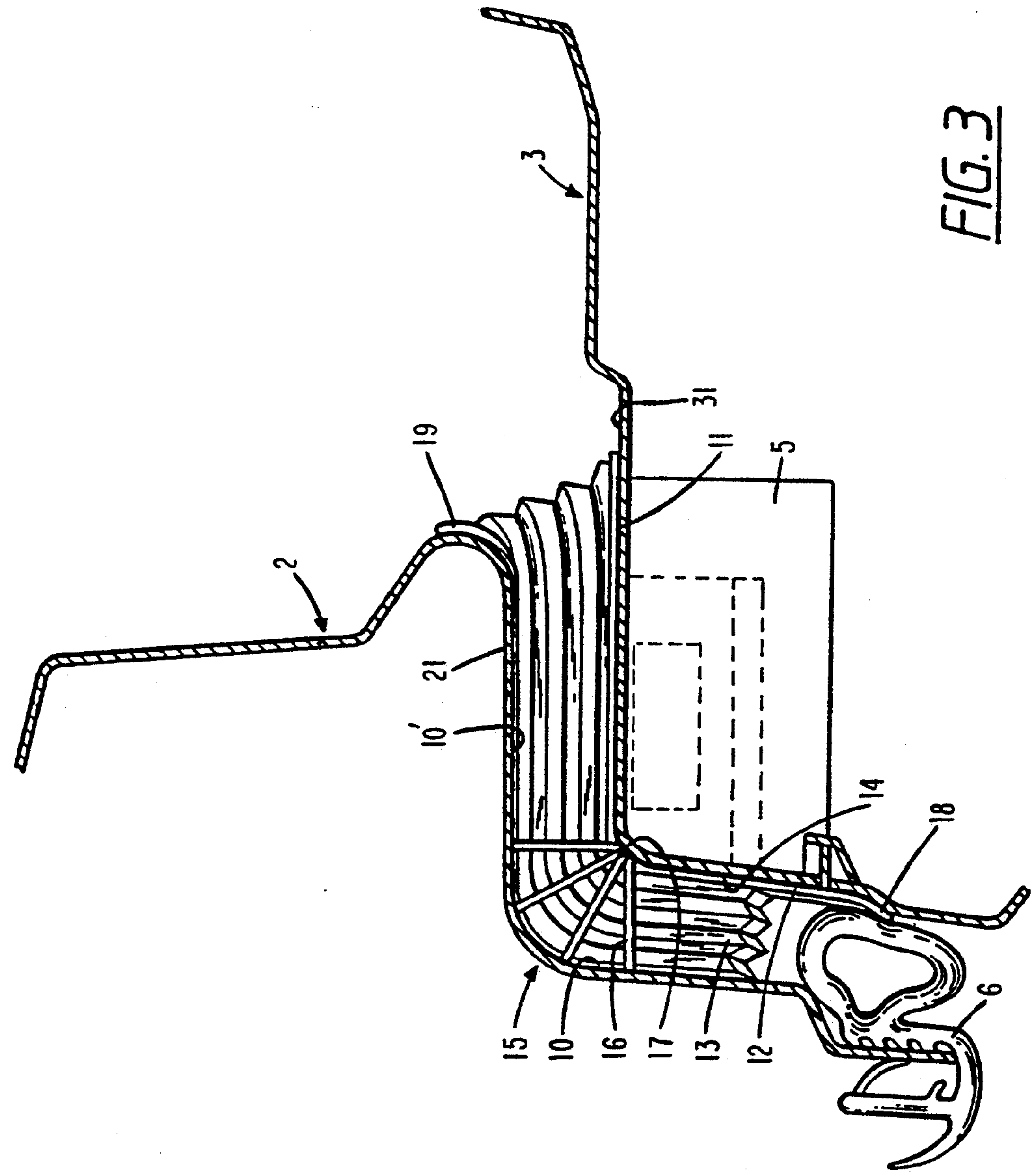
FIG. 3 shows the same section as in FIG. 2, where the door has been moved to a closed position.

In FIG. 3 the seal 1 is shown in an influenced activated position. The door 3 is in this position closed. The inner surface of the door 3 has hereby influenced the second part surface 12 of the combined sealing surface 11, 12 which forms the protruding part and has moved this to the left as shown in the drawing. The seal 1 has then pivoted about its pivot point 17. The angle $\beta$ will remain substantially the same, approximately 90°, due to the relative rigidity of the supporting element 14 carrying the combined sealing surface 11, 12. Thus, the first part surface 11 of the combined sealing surf ace 11, 12 is in sealing abutment against the rear surface 31 of the door 3. This part 11 of the combined sealing surface is thereby also substantially parallel to the plane A—A.

The function of the seal is such that when the door 3 is swung in towards its closed position, the door will in a certain position contact the second part surface 12 forming said protruding part of the annular combined sealing surface 11, 12 of the seal 1 according to the invention. A further displacement of the door towards its closed position moves the protruding part of the seal 1. This will result in a pivoting of the supporting element 14, which influences the entire combined sealing surface 11, 12. The supporting element and the combined sealing surface 11, 12 is accordingly swung around the substantially fixed pivot point 17. Thus, the angle a between the plane A—A and the first part surface 11 will successively decrease during the closure process of the door 3. When the door is completely closed, the protruding part, i.e. the second part surface 12, of the seal 1 has swung in at an angle substantially corresponding to angle $\alpha$ and hence also the first part surface 11 of the sealing surface adjacent the door pillar. This part 11 of the sealing surface is now substantially parallel to the plane A—A and seals actively against the rear surface 31 of the door 3.

Figure 4:
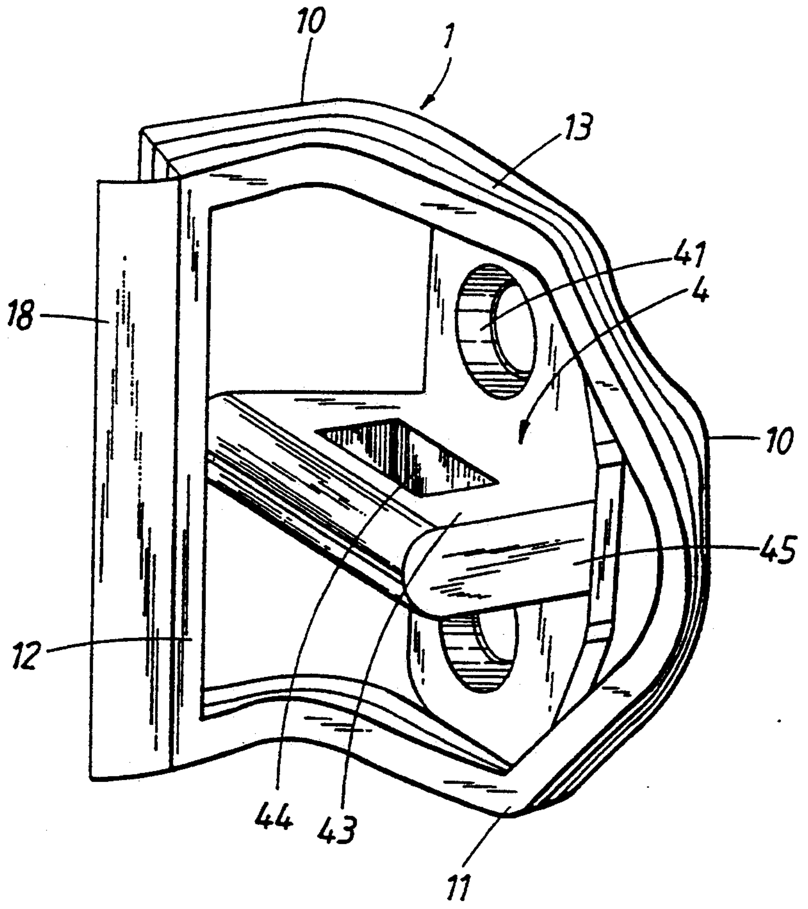
FIG. 4 is a perspective view of the seal according to the invention arranged in a preferred position of use.

FIG. 4 shows in perspective view the seal 1 together with a lock hook 4. The lock hook 4 and the seal 1 co-operate in such a way that by securing the lock hook by means of attaching elements through the holes 41, the seal 1 is also attached in a sealing manner at a predetermined location. The lock hook 4 consists of a base plate 42 and a part 43 protruding therefrom. The protruding part 43 is provided with an aperture 44 in which the working mechanism (not shown) of the locking arrangement is inserted at co-operation.

Figure 5:
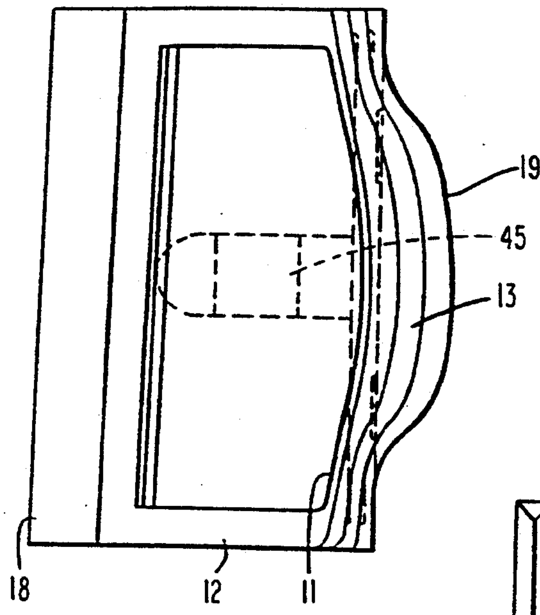
FIG. 5 is a vertical view of the invention in a first plane.

FIG. 5 shows the seal 1 and the lock hook 4 seen in a first vertical plane, which plane is parallel to the longitudinal direction of the vehicle. It is hereby apparent that the bent final part 19 of the base part 10 only forms a limited part of the total extension of the seal along its front edge.

Figure 6:
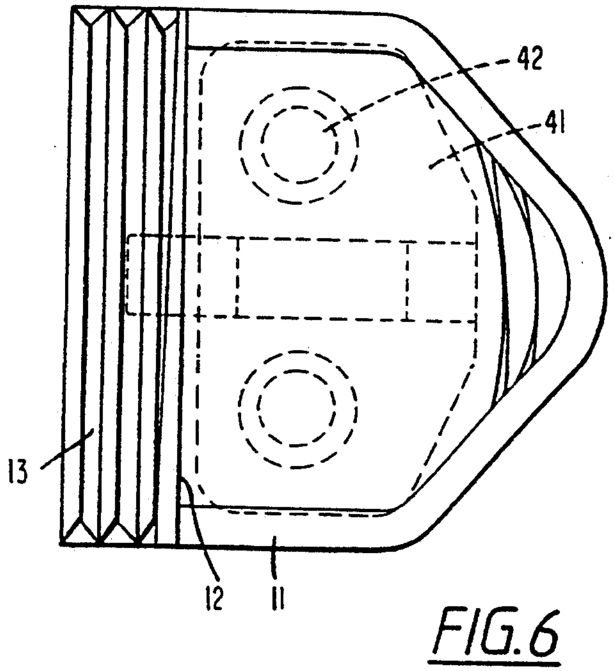
FIG. 6 is a vertical view of the seal according to the invention in a second plane.

FIG. 6 is a view in a second vertical plane of the arrangement according to the invention and a lock hook 4 where the vertical plane is perpendicular to the longitudinal direction of the vehicle. It appears from FIGS. 5 and 6 that the part 11 of the combined sealing surface 11, 12 which does not protrude presents a larger sealing surface than the part 12 which does protrude.

Figure 7:
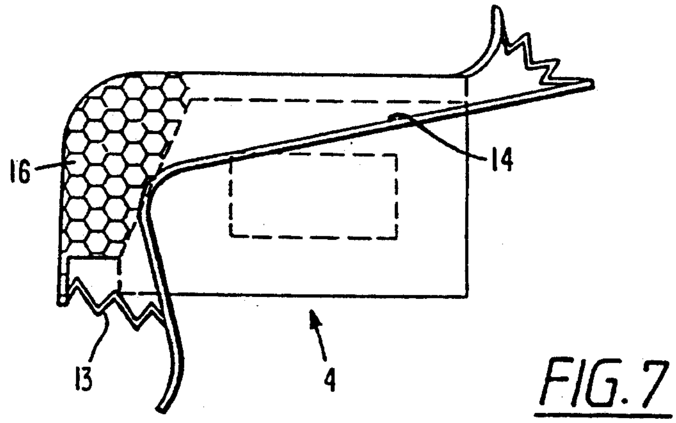
FIG. 7 is a horizontal section of an alternative embodiment of the invention.

FIG. 7 shows an alternative embodiment of a seal 1 according to the invention. The figure is a schematic section through a seal according to the invention and shows that an area 16 which is made up of 6-sided cells is used as a reinforcing element around which the outer frame 14 can pivot. This reinforcing element 16 is in the preferred embodiment compressible and elastic. The supporting element 14 is not rigidly attached at a certain pivot point 17 to this element, but can be allowed to perform small movements.

It is evident for the man skilled in the art that the above shown embodiments are only examples and consequently do not limit the invention. Although the seal in these examples has been shown and described only in combination with door locks for motor vehicles, the man skilled in the art will realize that other fields are imaginable, such as with different types of inspection holes or elsewhere where an annular sealing is desirable and where two of the surf aces that are to be sealed are displaced in two substantially parallel planes at the moment of closing. As has already been mentioned, the seal 1 is suitably integrated with the lock hook 4 so that no special adjustment of the seal is required and this is carried out in connection with the mounting and adjusting of the lock hook.

The invention is not limited to only mechanical solutions as shown but it is even conceivable to use it as a separate protruding part, i.e. a part which is separate from the seal, which through influence, when closing initiates activation of components, for example valves which open and permit pressured air to flow which in its turn can influence the seal to resume its active position.

The man skilled in the art will further realize that the expression "substantially parallel" relating to the given plane A—A and the first part surface 11 of the combined sealing surface in the active position must be given a wide interpretation. What is important is not to align this second surface compared to the first one, but that the sealing surface comes into abutment against the surface surrounding the lock. It is important that the seal 1 in its non-influenced position permits the door to approach its closed position without making contact between the first part surface 11 of the combined sealing surface and the surface against which it in its active position shall seal off, primarily to avoid squeezing and wearing influence at said first part surface 11. This has above been exemplified in connection with a vehicle where two of the surfaces 21, 31 are substantially parallel. In spite of deviations from this parallelism the invention satisfies its objects.

Further it is realized that the angle $\beta$ is completely dependent on the configuration of the door and can be accordingly varied as required.

What is claimed is:

1. A seal affixed to a surface on a first part for effecting a sealing contact between said surface and a surface on a second part when said first part and said second part are in a predetermined position with respect to each other, said first and second parts being moveable in relation to each other towards and away from said predetermined position, whereby at least a region of said surface on said first part defines a plane substantially parallel to which a region of said surface on said second part moves when approaching said predetermined position, said seal comprising;

i) a base part attached to said surface on said first part;

ii) an annular combined sealing surface comprising a first part surface and a second part surface, said first and second part surfaces intersecting at an intersection region at a first angle, and iii) an annular flexible element connecting said base part with said annular combined sealing surface, said seal being arranged such that when said first part and said second part are not in said predetermined position, said first part surface of the combined sealing surface forms a second angle in relation to said plane, and that in said predetermined position, said second part surface of said combined sealing surface is acted upon by a portion of said second part to thereby cause said first part surface of said combined sealing surface to adopt a position substantially parallel to said plane such that an area of said surface on said second part is sealingly enclosed by said combined sealing surface.

2. The seal as claimed in claim 1, wherein said seal further comprises a supporting element carrying said combined sealing surface and a hinging arrangement having a pivot point about which said supporting element and said combined sealing surface can pivot with respect to said base part of said seal.

3. The seal as claimed in claim 2, wherein said hinging arrangement is arranged at said intersection region of said first and second part surfaces of said combined sealing surface.

4. The seal as claimed in claim 3, wherein said hinging arrangement comprises at least one reinforcement which extends between said base part and said supporting element.

5. The seal as claimed in claim 4, wherein said pivot point is disposed in the vicinity of said combined sealing surface.

6. The seal as claimed in claim 5, wherein said supporting element and said reinforcement are an integrated element, with said pivot point being defined by a weakening at a transition between said supporting element and said reinforcement.

7. The seal as claimed in claim 1, wherein said flexible element is bellow-shaped and is made of rubber.

8. The seal as claimed in claim 5, wherein said reinforcement is a separate element which is adhesively attached to said base part.

* * * * *

UNITED STATES PATENT AND TRADEMARK OFFICE

CERTIFICATE OF CORRECTION

PATENT NO. : 5,269,538

DATED : December 14, 1993

INVENTOR(S) : Strang

It is certified that error appears in the above-identified patent and that said Letters Patent is hereby corrected as shown below:

On the Cover Page, Item [75], "Gothenburg" should read --Goteborg--.
On the Cover Page, under abstract line 6, "the" (second occurrence) should read --said--.
On the Cover Page, under abstract line 16, "the" should read --said--.
Column 1, line 25, after "surrounding", insert --seal--.
Column 1, line 25, delete "seal".
Column 3, line 52, "surf ace" should read --surface--.
Column 3, line 68, "a" should read --$\alpha$--.
Column 4, line 51, "surf aces" should read --surfaces--.

Signed and Sealed this

Second Day of August, 1994

Attest:

BRUCE LEHMAN

*Attesting Officer* *Commissioner of Patents and Trademarks*